United States Patent [19]

Kröner

[11] Patent Number: 4,934,907
[45] Date of Patent: Jun. 19, 1990

[54] METHOD AND APPARATUS FOR HEATING A FUEL

[75] Inventor: Martin Kröner, Esslingen, Fed. Rep. of Germany

[73] Assignee: J. Eberspächer, Esslingen, Fed. Rep. of Germany

[21] Appl. No.: 241,502

[22] Filed: Sep. 7, 1988

[30] Foreign Application Priority Data

Sep. 7, 1987 [DE] Fed. Rep. of Germany ....... 3729938

[51] Int. Cl.$^5$ ............................................ F04B 15/00
[52] U.S. Cl. .................................... 417/417; 417/501; 123/557
[58] Field of Search ............... 417/417, 490, 501, 415, 417/44, 53; 123/497, 499, 557

[56] References Cited

U.S. PATENT DOCUMENTS

| 2,116,596 | 5/1938 | Coffey | 123/557 X |
|---|---|---|---|
| 3,556,684 | 12/1968 | Rouquette | 417/417 X |
| 4,299,544 | 11/1981 | Masaka | 417/417 |
| 4,306,842 | 12/1981 | Masaka | 417/417 |
| 4,312,316 | 1/1982 | Seilly et al. | 417/417 X |
| 4,416,591 | 11/1983 | Horwinski | 417/417 X |
| 4,599,052 | 7/1986 | Langen et al. | 417/413 |
| 4,768,925 | 9/1988 | Geupel | 417/363 X |
| 4,778,357 | 10/1988 | Arai et al. | 417/417 |
| 4,832,583 | 5/1989 | Brown | 417/417 |

FOREIGN PATENT DOCUMENTS

| 60-198370 | 10/1985 | Japan | 123/499 |
|---|---|---|---|
| 2083565 | 3/1982 | United Kingdom | 417/417 |

Primary Examiner—Leonard E. Smith
Assistant Examiner—Eugene L. Szczecina, Jr.
Attorney, Agent, or Firm—McGlew & Tuttle

[57] ABSTRACT

A device for transporting and preheating fuel which is susceptible to cold temperatures comprises a pump which has an electromagnetic coil which is supplied with current to move a plunger for pumping the fuel so as to transport it. The plunger is returned for example, by a return spring and the electromagnetic coil is set out so that a maximum portion of the coil heats a fuel as it is passed through a pumping space. In accordance with the method of the invention, the coil has its own current supply control which advantageously may be set to supply a heating current which is in excess of that required for moving the plunger. A return spring set for returning the plunger may also be made stronger than necessary to effect return and the timing of the operation of the coil for moving the plunger may be set to be longer than necessary in order to keep the coil at a higher operating temperature and thus transform more heat to the fuel. The pump itself is designed so that the pumping space is in substantially direct contact with the housing for the electromagnetic coil so a maximum amount of temperature may be imparted. Casing for the pump may be a heat insulating casing or it may be arranged in an outer housing which is spaced from its exterior and the entire heating of the pump during its operation transfer to the fuel which is passed in between the pump housing and an outer housing.

12 Claims, 2 Drawing Sheets

METHOD AND APPARATUS FOR HEATING A FUEL

FIELD OF THE INVENTION

The invention relates in general to fuel transporting devices and in particular to a new and useful method and device for pumping fuel or transporting fuel susceptible to cold temperatures and particularly fuels which need to be transported with an electromagnetic pump and to a method of handling the fuel.

Fuels used particular for heat generation by combustion and for operating diesel IC engines, are to a large extent, susceptible to the cold for example, fuel oil or diesel oil which by their very nature have the property of forming paraffin crystals at temperatures a few degrees below 0°. If these crystals become more numerous and larger, the proper use of the fuel is increasingly prevented and, finally, becomes impossible. The crystals in the fuel obstruct narrow places in particular, of the areas through which it flows, This obstruction, as a rule, takes place first in commercially available fuel filters.

It is, possible, and indeed, widely practiced to mix additives to the fuel susceptible to cold temperatures which lowers the temperatures at which clouding of the fuel and crystallization occur by a few degrees. However, these additives are rather expensive and, moreover, the same problems are confronted again at, for example a temperature range of −10° to −20° C. unless large fractions of additives are mixed in.

In order to meet this problem, the fuel is electrically heated with a heating wire, in particular in the region of the entrance to the fuel filter. Such heaters represent a separate structural part and have considerable current consumption which is disturbing in particular in motor vehicles.

SUMMARY OF THE INVENTION

The invention provides a way of heating fuel susceptible to cold temperatures which utilizes devices already present for other purposes and is efficient in terms of current consumption.

To solve this task the preheating devices are characterized, according to the invention, in that an electromagnetic pump and/or its current supply control is (are) layed out for heat supply to the fuel.

The invention, consequently, puts into practice the principle of laying out an electromagnetic pump, which by its very nature produces dissipation heat, and/or its current supply intentionally in the direction that the dissipated heat, or the pump heat which is intentionally produced, to a greater degree, function to heat the fuel.

A particularly simple possible design comprises arranging the coil winding of the pump deliberately for greater heat generation for example making it of a material having a higher electrical resistance or of a wire with small cross section.

A further design possibility is to construct the pump intentionally for good heat conduction from the winding to the fuel. In this regard the choice of materials having good heat conductivity, of generous heat conductor cross sections etc., is particulary important.

The pump can be heat-insulted externally in order to keep the undesirable heat dissipation to the outside as small as possible and to achieve higher heat supply toward the interior to the fuel.

A further design possibility is to provide a sieve of metal (assigned to the pump in a manner known per se) through which the fuel must flow instead of as is customary of plastic because hereby the heat conduction from the site at which the sieve is fastened to the surface of the sieve is improved. This measure is particulary effective if a good heat-conducting connection is ensured from the winding to the site at which the sieve is fastened.

Instead of such constructional measures at the pump, or, in addition to them, the current supply control of the pump can be deliberately layed out so that it consumes more current than is required for the movement of the movable pump element.

A particulary preferred design measure in this direction consists in laying out the control in such a way that the winding each time after the pump stroke is completed remains current-carrying for a given time and only then is separated from the current supply for the return of the movable pump element.

The current supply control can be so formed that the winding to the pump can be supplied with current for a given time before transport begins.

The measures of current supply of the winding during times in which, normally, no throughflow of current per se would be required for the motion of the movable pump element, can be designed so as to be settable. Particularly to consider are change-over switching from "normal" summer operation to winter operation with intentional added heating-current throughflow times but also an automatic extension controlled in accordance with outside temperatures of separate heating current throughflow times.

A further possibility comprises arranging the pump in a distant housing with the fuel being able to flow through the space between the pump and the distant housing so that the heat given off by the pump to the outside is also utilized. In this case, the heat-insulation of the pump becomes superfluous.

An object of the invention is also to provide a method for current supply of a fuel pump, characterized in that the pump winding is impressed with current at times which are not required per se for the motion of the movable pump element.

Also possible are measures for deliberately impeding the movable pump element, for example, use of stiffer return spring of the movable pump element.

A further object of the invention is to provide an improved method of handling a fuel which is to be maintained a predetermined temperature which comprises transporting the fuel through an electromagnetic pump in which a coil is used to effect a movement of a plunger to effect pumping of the fuel from wherein the coil is maintained at a temperature and is positioned so that it contacts the fuel in a manner to impart a maximum amount of its heat thereto.

A further object of the invention is to provide an improved pump for transporting fuel in which there is a construction in which the fuel passes substantially in direct contact with the interior housing for the electromagnetic coil which moves a plunger for pumping the fuel.

A further object of the invention is to provide a device for transporting fuel which is simple in design, rugged in construction and economical to manufacture.

The various features of novelty which characterize the invention are pointed out with particularity in the claims annexed to and forming a part of this disclosure.

For a better understanding of the invention, its operating advantages and specific objects obtained by its uses, reference is made to the accompanying drawings and descriptive matter in which preferred embodiments of the invention are illustrated.

GENERAL DESCRIPTION OF THE PREFERRED EMBODIMENTS

Figure 1:
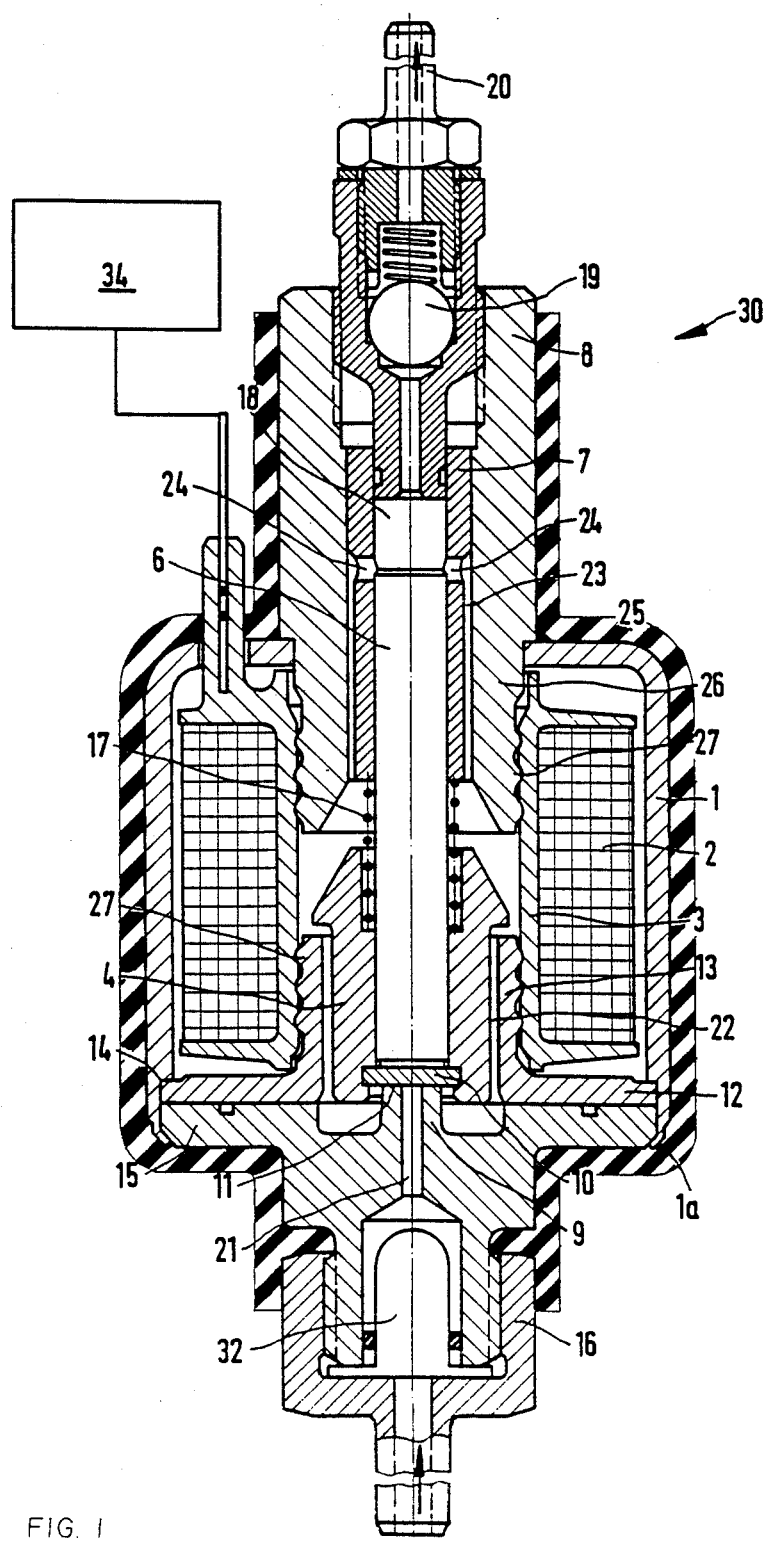
FIG. 1 is an axial sectional view of a pump for transporting and maintaining a fuel at a predetermined temperature constructed in accordance with the invention.
Figure 2:
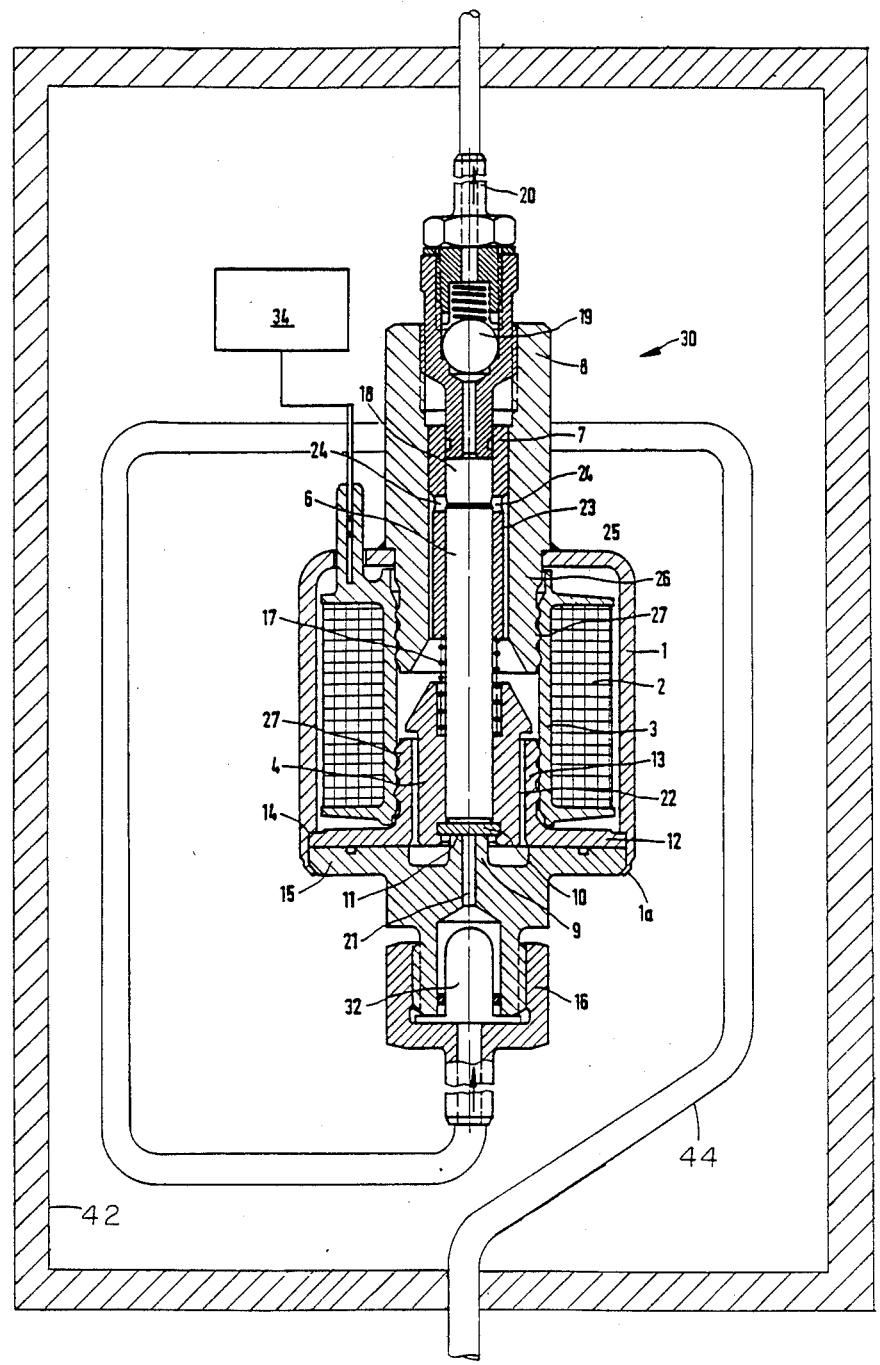
FIG. 2 is a cross-sectional view of the pump of FIG. 1 positioned in a housing.

Referring to the drawings in particular the invention embodied therein comprises a device such as an electromagnetic pump 30 having its own current supply control 34 for moving fuel and for also heating the fuel as it is moved. For this purpose the pump 30 includes an electromagnetically operated coil tube which is supplied with current from a current supply control 34 which has an inner coil form or wall which defines a pumping space 22 for fuel which is pumped by movement of a cylindrical piston 6 with an armature portion 4 in response to actuation of the coil 2.

The pump 30 comprises an axially upper cylinder block 8, a coil form 3 with a magnetic coil 2 wound on it, an essentially pot-shaped magnet case 1, armature 4 arranged within the coil 2 with cylindrical piston 6 embedded in it, a lower bottom part 12 of the magnet case 1, a lower face part 15, and a suction sleeve 16 as well as a pressure sleeve 20.

The coil form 3 is annular with one flange each projecting outward at its axially upper and axially lower end. The coil form 3 advantageously comprises a plastic or a magnetically nonconducting metal such as aluminum. The cylinder block 8 projects downward into the magnet case 1 and contains in an axial longitudinal bore a cylinder liner 7. The round bottom part 12 has a hollow-cylindrical portion 13 projecting upward. The face part 15 arranged below the bottom part 12 is round and fastened to the magnet case 1 with flanging 1a of the lower end region of the magnet case 1 along with the bottom part 12. The bottom part 12 rests against one shoulder 14 of the magnet case 1.

Into the cylinder case 8 a check valve unit 19 is screwed from above to which, in turn, the pressure sleeve 20 is screwed from above. The check valve unit 19 has a longitudinal bore and has a ball in the customary manner which is pressed against the valve seat by a spring. The check valve unit 1 projects from above into a central bore of the cylinder liner 7, which is pressed into the cylinder block. The upper free end region of piston 6 projects from below into the bore of the cylinder liner 7. The armature 4 is located to a great extent in an axial bore of the bottom part 12. Between the armature 4 and the cylinder liner 7 a return spring 17 is disposed. In the lower end region of the armature 4 a sealing disk 10 of an elastic material, for example Buna N, is fastened. The disc 10, in the shown lower portion of armature 4, sits on an upper central area 11 of the face part 15 forming a valve there. The face part 15 has a longitudinal bore in the axial direction. In the lower end region of the face part 15 a sieve o filter 32 of metal is located in a pocket bore. At the very bottom, the suction sleeve 16 is screwed onto the face part 15 which simultaneously fastens the sieve 32 by clamping a flange-like edge.

The part of the cylinder block 8 projecting into the magnet case 1 is provided on its outer circumference with bead rings 27. The same is true of tubular position 13 of the bottom part 12. The bead rings 27 firmly engage the inner circumference of the coil form 3 holding and positioning the coil form 3 with its coil 2 within the case 1. The cylinder block 8 is welded to the flange of the magnet case 1 projecting inward. The magnet case 1 comprises magnetically conducting material.

When current is impressed on coil 2 the armature 4 moves upward against the action of the return spring 17 together with piston 6 within the coil form 3, with the piston 6 being guided in the bore of cylinder liner 7. Due to this motion, transverse bores 24 in the cylinder liner 7 are closed and fuel is transported from one cylinder chamber 18 above the piston 6 under pressure through the check valve 19. In addition, the sealing disk 10 is raised from the valve seat 11 whereby fuel is drawn from bore 21 of the face part 15 into the space below the armature, the annular space between the armature 4 and the process 13, and the space axially between the ends of process 13 and process 26. Between the cylinder block 8 and the lower region of the cylinder liner 7 is located an annular chamber open in the downward direction which leads to the transverse bores 24. If the current is switched off through the coil 2 the armature moves downward under the action of the return spring 17 together with the piston 6. The valve 11 is closed and fuel reaches through the transverse bores 24 which are once again open into the cylinder chamber 18.

The bottom part 12 consists of magnetically conducting material.

A current supply control 34 is so formed that it supplies coil 2 at a given clock frequency with voltage and current impulses. According to the invention the control 34 is so formed that the duration of the current impulses is longer than would be required for moving the armature 4 upward. Consequently, the coil 2 with each stroke of the movable pump element 4 and 6 remains current-carrying for a longer time than would be required per se for the pump function so that heat is deliberately generated. Since the fuel flows axially inside along the central region of the coil form 3 it receives the "dissipated heat". In addition, the control 34 is so designed that it can supply uninterrupted current to coil 2 for a greater length of time, hence a current supply before the actual transporting by pump 30 begins.

Only after the equipment which needs to be fed with the transported fuel is switched on, for example a heating burner, a motor vehicle heater or an internal combustion engine, does the control 34 switch over from this preheating phase to the combined feeding and heating phase.

The control 34 is so developed that it can be switched either manually or thermostatically from summer operation and winter operation. In summer operation the described conditions of pure heating phase before transport begins and the longer current throughflow per stroke of the armature 4 are not required.

The coil 2 can be wound of a material having relatively high electrical resistance and/or of a wire with relatively small cross section so that it deliberately generates more heat. Heating the coil 2 also leads to heating the magnet case 1 which spreads through heat conduction to the cylinder bock 8, cylinder liner 7, bottom part 12, face part 15 and to the suction sleeve 16 including sieve 32. This leads to the sieve 32 heating up and to further heat transfer to the fuel which flows through the mentioned parts. In addition, heat conduction exists from the coil form directly to the cylinder block 8 and the bottom part 12, which can be further improved by manufacturing the coil form 3 of a material which is magnetically non-conducting but is a good heat conductor. It is advantageous to provide a metal to metal fastening of sieve 32 such that it is in contact within the face part 15 and suction sleeve part 16.

The pump can be surrounded with heat-insulating casing 40 (see FIG. 1), in the simplest case in the form of an axially divided rubber cover, but also in the form of a cover of a stronger insulating material.

It is further advantageous to arrange the entire pump 30 in a housing 42 with the fuel flowing through line 44 through the space between the pump and the housing 42 before it is drawn in by the suction sleeve 16. In this manner that heat which is given off by pump 30 to the outside is still utilized for heat supply to the fuel.

The pump can also be used as circulation pump so that a gradual warming up of a quantity of fuel results.

Preheating device for preventing cooling of fuel while it is transported includes electromagnetic pump in which the electromagnetic pump and/or its current supply control 34 is constructed to cause a heat supply to the fuel.

While specific embodiments of the invention have been shown and described in detail to illustrate the application of the principles of the invention, it will be understood that the invention may be embodied otherwise without departing from such principles.

What is claimed:

1. A fuel pumping and heating arrangement, comprising: a cylinder body; a piston movable in said cylinder body, said piston cooperating with said cylinder body to define a cylinder chamber, said cylinder body defining a fuel inlet to said cylinder chamber and a fuel outlet from said cylinder chamber; armature means, connected to said piston for movement with said piston; magnetic coil means for generating a magnetic field to move said armature and move said piston with respect to said cylinder body; heat transfer means, including a coil support element for forming and supporting said coil, said heat transfer means defining a heat transfer space adjacent said coil, said heat transfer space being connected with said fuel inlet, for transfer of heat generated in said magnetic coil means to said fuel; and, control means connected to said magnetic coil means, said control means including a pulsed current supply, said control means for supplying current to said winding in current pulses and for adjusting the duration of said current pulses for regulating the heating of the fuel.

2. An arrangement according to claim 1, wherein said support element for forming and supporting said coil includes a metal portion forming an inner surface of said heat transfer space and having an outer surface engaging said magnetic coil means, said coil support element formed of a non-magnetically conductive material which is highly heat-conductive.

3. An arrangement according to claim 1, wherein said magnetic coil and heat transfer means are surrounded by a heat insulating casing.

4. An arrangement according to claim 1, wherein said heat transfer means includes a heat conductive member in contact with the said coil support element and communicating with said heat transfer space, said heat conductive element contacting a heat conductive filter for heat transfer to said heat conductive filter, said heat conductive filter being positioned in the path of said fuel.

5. An arrangement according to claim 1, wherein said current pulses are adjusted to a pulse duration—which is longer than the duration of a current pulse needed to complete a pumping stroke of said piston.

6. An arrangement according to claim 1, wherein said control means includes means for supplying current to said magnetic coil means without movement of said piston, thereby heating the fuel before pumping the fuel.

7. An arrangement according to claim 1, wherein said control means includes means for providing current flow to said magnetic coil means prior to and after a pumping stroke of the piston to heat fuel prior to and after pumping.

8. An arrangement according to claim 1, further comprising a fuel line connected to said heat transfer space and housing means substantially surrounding said cylinder body and substantially surrounding said magnetic coil means and a portion of said fuel line for heating fuel in said fuel line prior to fuel passing into said heat transfer space.

9. A method for pumping and heating fuel using a cylinder body, a piston movable in the cylinder body, the piston cooperating with the cylinder body to define a cylinder chamber, the cylinder body defining a fuel inlet and a fuel outlet, an armature connected to the piston for movement with the piston, a magnetic coil for generating a magnetic field to move the armature, the coil disposed about the armature, comprising the steps of: providing a non-magnetic highly heat-conductive element forming a support for the magnetic coil to define a heat transfer space within the magnetic coil adjacent the fuel inlet and regulating the heating of the fuel by transmitting current pulses to the magnetic coil of a duration which is greater than the duration of a current pulse needed to provide a stroke of the piston by moving the armature.

10. A method according to claim 9, wherein a metallic heat conducting filter element is positioned at an inlet to the heat transfer space, the metallic filter element being in contact with a metallic surface heated by the non-magnetic highly heat-conductive member.

11. A method according to claim 9, wherein the heating of the fuel is regulated by providing current flow to the magnetic coil prior to and after each pumping stroke.

12. An arrangement according to claim 1, wherein said support element is connected to an exterior portion of said cylinder body, coaxial with said cylinder body, said support element being formed of a non-magnetic, highly heat-conductive material, said fuel inlet being defined at an end of said cylinder body extending into the heat transfer space defined by said support element.

* * * * *